(12) United States Patent
Martinez et al.

(10) Patent No.: US 10,210,334 B2
(45) Date of Patent: Feb. 19, 2019

(54) SYSTEMS AND METHODS FOR SOFTWARE INTEGRITY ASSURANCE VIA VALIDATION USING BUILD-TIME INTEGRITY WINDOWS

(71) Applicant: Dell Products L.P., Round Rock, TX (US)

(72) Inventors: Ricardo L. Martinez, Leander, TX (US); Balasingh P. Samuel, Round Rock, TX (US); Garrett B. Oncale, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 15/285,330

(22) Filed: Oct. 4, 2016

(65) Prior Publication Data

US 2018/0096152 A1    Apr. 5, 2018

(51) Int. Cl.
*G06F 11/00* (2006.01)
*G06F 21/57* (2013.01)

(52) U.S. Cl.
CPC ................... *G06F 21/575* (2013.01)

(58) Field of Classification Search
CPC ... G06F 21/577; G06F 21/12; G06F 2221/033
USPC ............................................... 726/25
See application file for complete search history.

(56) References Cited

U.S. PATENT DOCUMENTS

| | | | | |
|---|---|---|---|---|
| 2007/0277037 A1* | 11/2007 | Langer | ..................... | G06F 21/54 713/176 |
| 2008/0215891 A1* | 9/2008 | Horne | ..................... | G06F 21/16 713/187 |
| 2016/0019058 A1* | 1/2016 | Hu | ..................... | G06F 21/51 717/124 |
| 2017/0255779 A1* | 9/2017 | Caklovic | .................. | G06F 21/51 |

* cited by examiner

*Primary Examiner* — Mohammad W Reza
(74) *Attorney, Agent, or Firm* — Jackson Walker L.L.P.

(57) ABSTRACT

In accordance with embodiments of the present disclosure, an article of manufacture may include a non-transitory computer readable medium and computer-executable instructions carried on the computer readable medium, the instructions readable by a processor, the instructions, when read and executed, for causing the processor to receive software code for an executable file, receive a configuration file, output an executable file based on the software code and the configuration file, the executable file comprising one or more integrity windows of code embedded within the software code and not affecting operation of software code within the executable file, and output a map file setting forth metadata regarding the integrity windows.

16 Claims, 3 Drawing Sheets

SYSTEMS AND METHODS FOR SOFTWARE INTEGRITY ASSURANCE VIA VALIDATION USING BUILD-TIME INTEGRITY WINDOWS

TECHNICAL FIELD

The present disclosure relates in general to information handling systems, and more particularly to software integrity assurance in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when the information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

Because of the importance of a BIOS in the overall execution of an information handling system, many customers of information handling systems demand that vendors of information handling systems assure that information handling systems and the code stored thereon, including but not limited to the BIOS, be free of malicious code upon delivery. Typically, to assure a BIOS free of malicious code, a BIOS is signed with a signature or other uniquely identifying data created based on the content of the BIOS code, such that when later executed, the BIOS is compared to the signature to validate the integrity of the BIOS. If the BIOS is validated, it may complete execution. Otherwise, if the BIOS in not validated, BIOS execution may be halted to prevent execution of potentially-malicious code.

To assure that digital signature validation of BIOS or other code is properly executing to identify unvalidated code, developers and test engineers of such validation software have typically consisted of manual modification by a person to various bits in a signed executable or other file and then checking for a digital signature failure. Such approach may require high overhead for developers and test engineers to perform these modifications for every code release to validation, plus such approach is not scalable, and has limited testing scope and testing scenarios. In some software development methodologies, a signed BIOS or other executable file may have releases occurring as frequently as daily, further adding to the overhead. In addition, in some cases, these binary modifications are sometimes not performed by skilled technicians and may include other unexpected or errant test results from the modifications, increasing engineering burden of this approach even further.

SUMMARY

In accordance with the teachings of the present disclosure, the disadvantages and problems associated with supply chain assurance in an information handling system have been reduced or eliminated.

In accordance with embodiments of the present disclosure, an article of manufacture may include a non-transitory computer readable medium and computer-executable instructions carried on the computer readable medium, the instructions readable by a processor, the instructions, when read and executed, for causing the processor to receive software code for an executable file, receive a configuration file, output an executable file based on the software code and the configuration file, the executable file comprising one or more integrity windows of code embedded within the software code and not affecting operation of software code within the executable file, and output a map file setting forth metadata regarding the integrity windows.

In accordance with these and other embodiments of the present disclosure, a method may include receiving software code for an executable file, receiving a configuration file, outputting an executable file based on the software code and the configuration file, the executable file comprising one or more integrity windows of code embedded within the software code and not affecting operation of software code within the executable file, and outputting a map file setting forth metadata regarding the integrity windows.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to receive a map file setting forth metadata regarding one or more integrity windows of code embedded within software code of an executable file, wherein the code of the one or more integrity windows does not affect operation of software code within the executable file, based on the map file, inject data into the one or more integrity windows of the executable file, and determine whether signature validation software for validating the executable file validates the executable file as modified by the injected data.

In accordance with these and other embodiments of the present disclosure, a method may include receiving a map file setting forth metadata regarding one or more integrity windows of code embedded within software code of an executable file, wherein the code of the one or more integrity windows does not affect operation of software code within the executable file, based on the map file, injecting data into the one or more integrity windows of the executable file, and determining whether signature validation software for validating the executable file validates the executable file as modified by the injected data.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

Figure 1:
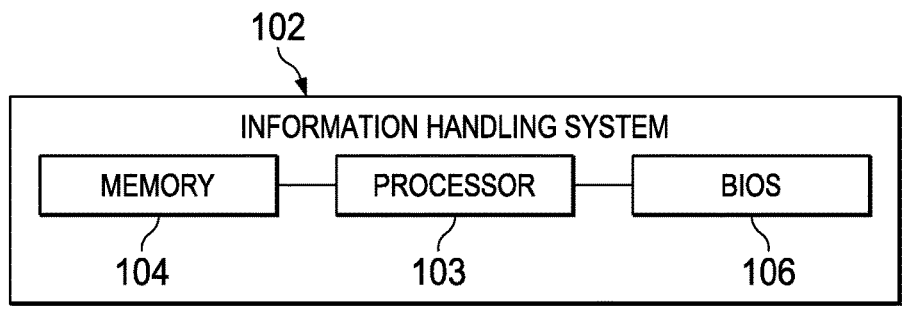
FIG. 1 illustrates a block diagram of an example information handling system, in accordance with certain embodiments of the present disclosure.

FIG. 1 illustrates a block diagram of an example information handling system 102, in accordance with certain embodiments of the present disclosure. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, and a BIOS 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 106 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 106 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Figure 2:
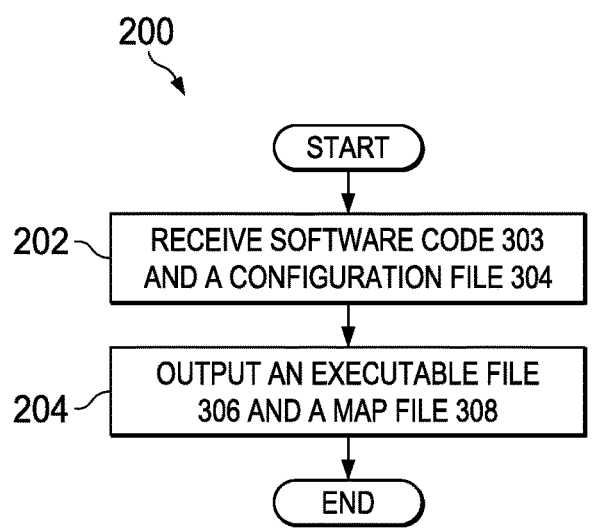
FIG. 2 illustrates a flow chart of an example method for generating an executable file with integrity windows for assuring integrity of digital signature security validation software, in accordance with certain embodiments of the present disclosure.
Figure 3:
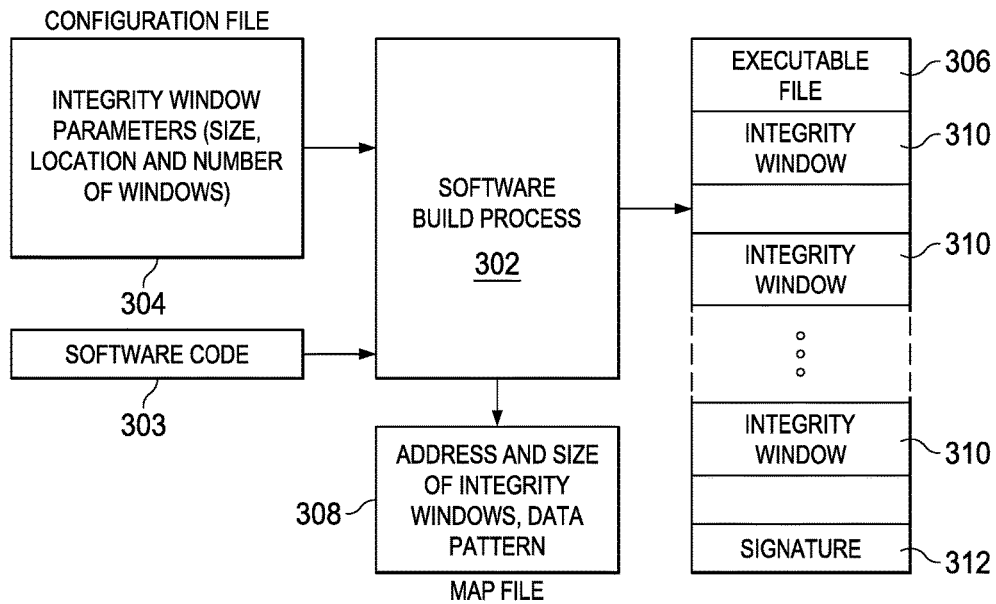
FIG. 3 illustrates an example flow diagram further illustrating the example method shown in FIG. 2, in accordance with embodiments of the present disclosure.

FIG. 2 illustrates a flow chart of an example method 200 for generating an executable file with integrity windows for assuring integrity of digital signature security validation software, in accordance with certain embodiments of the present disclosure. Further, FIG. 3 illustrates an example flow diagram further illustrating example method 200 shown in FIG. 2, in accordance with embodiments of the present disclosure.

According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a software build process 302 may receive as inputs software code 303 and a configuration file 304. Software build process 302 may comprise a program of instructions embodied on a computer-readable medium (e.g., memory 104) and executable by a processor (e.g., processor 103) in order to carry out the functionality of software build process 302, as described herein. Software code 303 may comprise a program of instructions embodied on a computer-readable medium (e.g., memory 104) and executable by a processor (e.g., processor 103) in order to carry out a desired functionality of software code 303 (e.g., a BIOS or other executable program). Configuration file 304 may comprise any suitable data structure(s) setting forth integrity window parameters for integrity windows to be created by software build process 302, as set forth in greater detail below. Such integrity window parameters may include, without limitation, a number of integrity windows to be created in an executable file, the sizes of the integrity windows to be created in the executable file, one or more locations to be created in the executable file, and a random number that may be used to generate a data pattern for data to be stored within integrity windows to be created in the executable file. In some embodiments, the sizes, locations, and numbers of integrity windows set forth in configuration file 304 may be randomly generated.

At step 204, based on the software code 303 and configuration file 304, software build process 302 may output an executable file 306 and a map file 308. As shown in FIG. 3, executable file 306 may include integrity windows 310 embedded within segments of code based on software code 303. An integrity window 310 may comprise a reserved block of code which is transparent to the normal operation of software code 303 included within executable file 306. For example, an integrity window 310 may include "no operation" or "NOP" instructions so as to not have any effect on execution of executable file 306. Accordingly, such integrity windows 310 may be included in all production releases of the executable file and only have the minor drawback of a slightly increased size of executable file 306. As shown in FIG. 3, executable file 306 may also include a signature 312. Signature 312 may comprise any suitable uniquely-identifying information for executable file 306, and may be based in whole or in part on the contents of executable file 306 itself (e.g., a mathematical cryptography algorithm may be applied to executable file 306 to generate signature 312).

Map file 308 generated by software build process 302 may include one or more data structures setting forth metadata regarding executable file 306, in particular the addresses and sizes of integrity windows 310 embedded within executable file 306. In some embodiments, map file 308 may also include one or more data patterns to inject into integrity windows 310 when assuring integrity of a digital signature security validation, as described in greater detail below.

Although FIG. 2 discloses a particular number of steps to be taken with respect to method 200, method 200 may be executed with more or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 4:
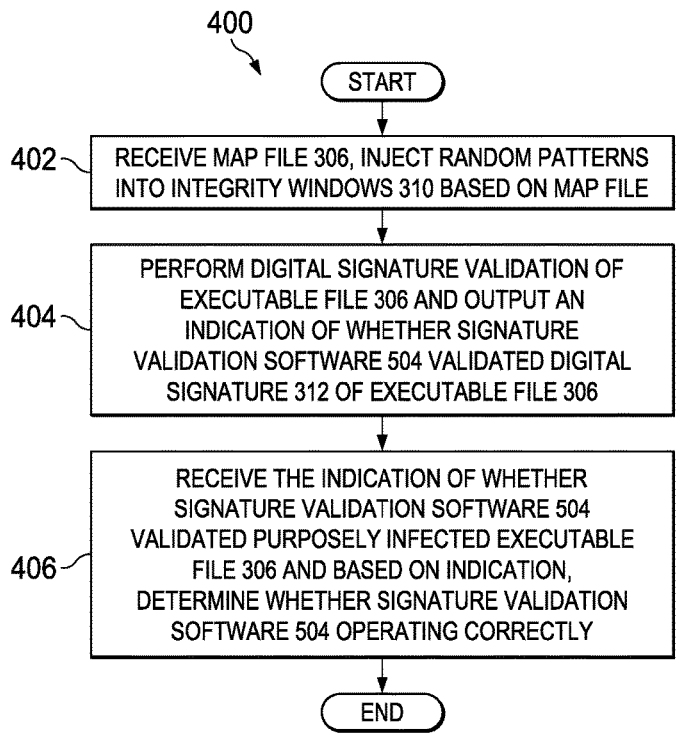
FIG. 4 illustrates a flow chart of an example method for assuring integrity of digital signature security validation software using an executable file with integrity windows, in accordance with certain embodiments of the present disclosure.
Figure 5:
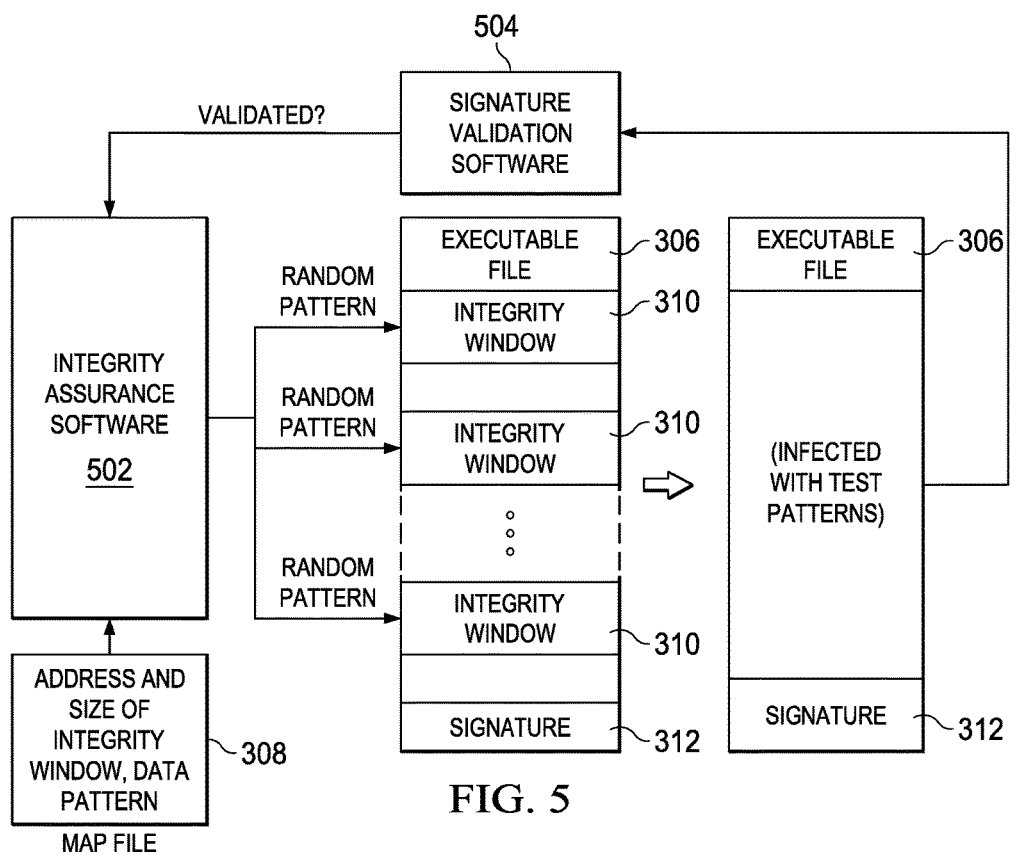
FIG. 5 illustrates an example flow diagram further illustrating the example method shown in FIG. 4, in accordance with embodiments of the present disclosure.

FIG. 4 illustrates a flow chart of an example method 400 for assuring integrity of digital signature security validation software using an executable file with integrity windows in accordance with certain embodiments of the present disclosure. Further, FIG. 5 illustrates an example flow diagram further illustrating example method 400 shown in FIG. 4, in accordance with embodiments of the present disclosure.

According to one embodiment, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, integrity assurance software 502 may receive map file 308 as an input, and based thereon, inject random patterns into the one or more integrity windows 310 of executable file 306, in order to generate an executable file infected (within integrity windows 310) with test patterns. Integrity assurance software 502 may comprise a program of instructions embodied on a computer-readable medium (e.g., memory 104) and executable by a processor (e.g., processor 103) in order to carry out the functionality of integrity assurance software 502, as described herein.

At step 404, signature validation software 504 may perform digital signature validation of executable file 306 and output an indication of whether signature validation software 504 validated digital signature 312 of executable file 306 or found digital signature 312 to not be a match to executable file 306. A finding of digital signature 312 not matching with purposely-infected executable file 306 would indicate that signature validation software 504 is operating correctly, while signature validation software 504 validating purposely-infected executable file 306 would indicate that signature validation software 504 is not operating correctly.

At step 406, integrity assurance software 502 may receive the indication of whether signature validation software 504 validated purposely-infected executable file 306 and based on such indication, determine whether signature validation software 504 is operating correctly, thus providing integrity assurance of signature validation software 504.

Although FIG. 4 discloses a particular number of steps to be taken with respect to method 400, method 400 may be executed with more or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Although FIGS. 4 and 5 contemplate the validation of a single executable file 306 with purposely-infected integrity windows 310, in some embodiments, integrity assurance software 502 may generate multiple executable files 306 each with a different random pattern of data injected into integrity windows 310.

Advantageously, using the methods and systems described herein, because integrity windows 310 are known by the validation context of integrity assurance software 502, automated positive and negative testing can be performed by interweaving "good" and "bad" data sets, thus increasing validation scenario throughput. In addition, depending on the computing power available for testing and the number and size of integrity windows 310, an exhaustive test can be run to validate that there are no possible collisions in the hash/signing implementation (e.g., via brute force application of every binary combination in each integrity window 310). Furthermore, when verifying a BIOS, the BIOS and a watchdog timer may be used for automated recovery after validation is complete (e.g., BIOS 106 may restore NOP instructions into integrity windows 310). Moreover, automation testing could also be implemented to test multiple failure scenarios in which, after validation, then injection of random data could be turned off, or if a reboot timeout, integrity windows 310 could be reset.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An article of manufacture comprising:
   a non-transitory computer readable medium; and
   computer-executable instructions carried on the computer readable medium, the instructions readable by a processor, the instructions, when read and executed, for causing the processor to:
      receive software code for an executable file;
      receive a configuration file;
      output the executable file based on the software code and the configuration file, the executable file comprising one or more integrity windows of code embedded within the software code and not affecting operation of software code within the executable file; and
      output a map file setting forth metadata regarding the integrity windows, wherein the map file is usable by integrity assurance software to assure integrity of signature validation software by injecting data into the one or more integrity windows of the executable file and determining whether the signature validation software validates the executable file as modified by the injected data.

2. The article of claim 1, wherein one or more integrity windows comprise no operation instructions.

3. The article of claim 1, wherein the metadata comprises at least one of addresses for the one or more integrity windows and sizes of the one or more integrity windows.

4. The article of claim 1, wherein the configuration file sets forth one or more parameters for creating the one or more integrity windows within the executable file, including at least one of sizes of the one or more integrity windows, address locations of the one or more integrity windows, and a number of the one or more integrity windows.

5. The article of claim 1, wherein the executable file comprises a basic input/output system.

6. A method comprising:
   receiving software code for an executable file;
   receiving a configuration file;
   outputting the executable file based on the software code and the configuration file, the executable file comprising one or more integrity windows of code embedded within the software code and not affecting operation of software code within the executable file; and
   outputting a map file setting forth metadata regarding the integrity windows, wherein the map file is usable by integrity assurance software to assure integrity of signature validation software by injecting data into the one or more integrity windows of the executable file and determining whether the signature validation software validates the executable file as modified by the injected data.

7. The method of claim 6, wherein the one or more integrity windows comprise no operation instructions.

8. The method of claim 6, wherein the metadata comprises at least one of addresses for the one or more integrity windows and sizes of the one or more integrity windows.

9. The method of claim 6, wherein the configuration file sets forth one or more parameters for creating the one or more integrity windows within the executable file, including at least one of sizes of the one or more integrity windows, address locations of the one or more integrity windows, and a number of the one or more integrity windows.

10. The method of claim 6, wherein the executable file comprises a basic input/output system.

11. An article of manufacture comprising:
a non-transitory computer readable medium; and
computer-executable instructions carried on the computer readable medium, the instructions readable by a processor, the instructions, when read and executed, for causing the processor to:
receive a map file setting forth metadata regarding one or more integrity windows of code embedded within software code of an executable file, wherein the code of the one or more integrity windows does not affect operation of software code within the executable file;
based on the map file, inject data into the one or more integrity windows of the executable file; and
determine whether signature validation software for validating the executable file validates the executable file as modified by the injected data.

12. The article of claim 11, wherein the metadata comprises at least one of addresses for the one or more integrity windows and sizes of the one or more integrity windows.

13. The article of claim 11, wherein the executable file comprises a basic input/output system.

14. A method comprising:
receiving a map file setting forth metadata regarding one or more integrity windows of code embedded within software code of an executable file, wherein the code of the one or more integrity windows does not affect operation of software code within the executable file;
based on the map file, injecting data into the one or more integrity windows of the executable file; and
determining whether signature validation software for validating the executable file validates the executable file as modified by the injected data.

15. The method of claim 14, wherein the metadata comprises at least one of addresses for the one or more integrity windows and sizes of the one or more integrity windows.

16. The method of claim 14, wherein the executable file comprises a basic input/output system.

* * * * *